United States Patent
Kalwa (10) Patent No.: US 12,487,174 B2
(45) Date of Patent: Dec. 2, 2025

(54) METHOD FOR SIMULTANEOUSLY DETERMINING PARAMETERS OF AT LEAST ONE RESIN LAYER APPLIED TO AT LEAST ONE CARRIER MATERIAL

(71) Applicant: Flooring Technologies Ltd., Kalkara (MT)

(72) Inventor: Norbert Kalwa, Horn-Bad Meinberg (DE)

(73) Assignee: Flooring Technologies Ltd., Kalkara (MT)

( * ) Notice: Subject to any disclaimer, the term of this patent is extended or adjusted under 35 U.S.C. 154(b) by 94 days.

(21) Appl. No.: 17/914,554

(22) PCT Filed: Mar. 24, 2021

(86) PCT No.: PCT/EP2021/057533
§ 371 (c)(1),
(2) Date: Sep. 26, 2022

(87) PCT Pub. No.: WO2021/191254
PCT Pub. Date: Sep. 30, 2021

(65) Prior Publication Data
US 2023/0145539 A1    May 11, 2023

(30) Foreign Application Priority Data

Mar. 27, 2020 (EP) .................................... 20166313
Apr. 14, 2020 (EP) .................................... 20169323

(51) Int. Cl.
*G01N 21/359* (2014.01)
*G01N 21/27* (2006.01)
(Continued)

(52) U.S. Cl.
CPC ......... *G01N 21/359* (2013.01); *G01N 21/274* (2013.01); *G01N 2021/8416* (2013.01);
(Continued)

(58) Field of Classification Search
CPC ............... G01N 21/359; G01N 21/274; G01N 2021/8416; G01N 2021/8427;
(Continued)

(56) References Cited

U.S. PATENT DOCUMENTS 6,028,682 A    2/2000  Ott et al.
9,759,653 B2 *  9/2017  Kalwa ................ G01N 21/3563
(Continued)

FOREIGN PATENT DOCUMENTS

CN       107533001 A       1/2018
DE    102015105039 A1     10/2016
(Continued)

*Primary Examiner* — David P Porta
*Assistant Examiner* — Gisselle M Gutierrez
(74) *Attorney, Agent, or Firm* — The Webb Law Firm (57) ABSTRACT

Provided is a method for the simultaneous determination of parameters, in particular of at least two, three or four parameters, of at least one resin layer applied to at least one carrier material by recording and evaluating at least one NIR spectrum in a wavelength range between 500 nm and 2500 nm, preferably between 700 nm and 2000 nm, more preferably between 900 nm and 1700 nm, and particularly advantageously between 1450 nm and 1550 nm, using at least one NIR measuring head, in particular at least one NIR multimeter head.

25 Claims, 2 Drawing Sheets

(51) Int. Cl.
G01N 21/84 (2006.01)
G01N 21/86 (2006.01)

(52) U.S. Cl.
CPC ........... *G01N 2021/8427* (2013.01); *G01N 2021/845* (2013.01); *G01N 2021/8472* (2013.01); *G01N 2021/8663* (2013.01); *G01N 2201/101* (2013.01)

(58) Field of Classification Search
CPC ..... G01N 2021/845; G01N 2021/8472; G01N 2021/8663; G01N 2201/101; G01N 2021/8411; G01N 21/86; G01N 21/8422; G01N 21/57; G01N 2021/8917; G01N 2201/129; G01N 21/3563; G01N 21/3554
See application file for complete search history.

(56) References Cited

U.S. PATENT DOCUMENTS

| | | | | |
|---|---|---|---|---|
| 10,346,969 | B1* | 7/2019 | Raghu | G06N 3/08 |
| 2003/0048440 | A1* | 3/2003 | Lindgren | G01N 21/3563 |
| | | | | 356/300 |
| 2004/0094851 | A1* | 5/2004 | Mbachu | B27N 3/18 |
| | | | | 264/109 |
| 2004/0113078 | A1* | 6/2004 | Dessipri | B29C 35/0288 |
| | | | | 250/339.12 |
| 2004/0195714 | A1* | 10/2004 | Mbachu | B05B 12/126 |
| | | | | 156/64 |
| 2005/0140037 | A1* | 6/2005 | Mbachu | B27N 3/18 |
| | | | | 156/64 |
| 2005/0241743 | A1* | 11/2005 | Mbachu | G01N 21/274 |
| | | | | 73/1.01 |
| 2007/0131862 | A1* | 6/2007 | Cowan | G01N 21/274 |
| | | | | 250/339.09 |
| 2009/0117606 | A1* | 5/2009 | Tunnell | A61B 5/1455 |
| | | | | 435/29 |
| 2014/0192361 | A1* | 7/2014 | Endo | G01N 21/55 |
| | | | | 356/446 |
| 2016/0047741 | A1 | 2/2016 | Lober et al. | |
| 2016/0123871 | A1* | 5/2016 | Kalwa | G01N 21/3563 |
| | | | | 250/340 |
| 2018/0017505 | A1* | 1/2018 | Shelley, Jr. | G01N 21/954 |
| 2018/0080867 | A1* | 3/2018 | Denk | G01N 21/8422 |
| 2023/0145539 | A1* | 5/2023 | Kalwa | G01N 21/86 |
| | | | | 250/339.12 |

FOREIGN PATENT DOCUMENTS

| | | | | |
|---|---|---|---|---|
| EP | 2915658 | A1 | 9/2015 | |
| EP | 3238934 | A1 * | 11/2017 | ............ B32B 21/06 |
| EP | 3327424 | B1 * | 12/2018 | ........... B32B 29/005 |
| EP | 3428619 | A1 | 1/2019 | |
| EP | 3428619 | B1 * | 11/2019 | ......... G01B 11/0625 |
| EP | 4191230 | B1 * | 8/2024 | ........... G01N 21/359 |
| WO | 0169191 | A1 | 9/2001 | |
| WO | 2016162196 | A1 | 10/2016 | |

* cited by examiner

FIG 2

METHOD FOR SIMULTANEOUSLY DETERMINING PARAMETERS OF AT LEAST ONE RESIN LAYER APPLIED TO AT LEAST ONE CARRIER MATERIAL

CROSS-REFERENCE TO RELATED APPLICATIONS

This application is the United States national phase of International Patent Application No. PCT/EP2021/057533, filed Mar. 24, 2021, and claims priority to European Patent Application No. 20166313.5, filed Mar. 27, 2020, and European Patent Application No. 20169323.1, filed Apr. 14, 2020, the disclosures of which are hereby incorporated by reference in their entirety.

BACKGROUND OF THE INVENTION

Field of the Invention

The disclosure relates to a method for simultaneously determining parameters, in particular at least two parameters, of at least one resin layer applied to at least one carrier material, to a production line for carrying out this method and to the use of the determined parameters for controlling at least one such production line.

Description of Related Art

In the production of industrial "prepregs" (impregnates, e.g. resin-impregnated paper layers) or surface coatings in the wood-based materials industry, carrier materials are impregnated or coated with impregnating resins, varnishes, etc. It is essential that the specified parameters (composition, application quantity, moisture, degree of cross-linking, etc.) are adhered to as precisely as possible. The fact that several parameters usually have to be determined at the same time increases the testing effort. Another complicating factor is that these parameters do not have to be determined automatically but, for example, by weighing. This leads to a loss of time and is particularly problematic in the case of fast-running systems, as a lot of time may pass before the parameters are determined or adjusted. To solve this problem, more and more measuring systems are being used that determine individual parameters.

It is known, for example, that according to DE 10 2015 105 039 A1, individual parameters on an impregnation plant can be determined by an NIR (Near Infra Red) measuring method. This parameter determination can then be used to control the system. However, only the determination of individual parameters is planned. In addition, it remains unclear in which form the control should then be carried out.

However, at an impregnation plant where papers are impregnated with thermosetting resins, for example, a whole set of parameters must be tested. These are the resin/varnish application, the moisture, the degree of cross-linking, the content of mineral components (corundum, titanium dioxide, chalk, colour pigments, etc.), etc. In the past, a combination of several automatic and/or manual measuring methods had to be used to determine this multitude of parameters.

Manual measurement is the worst method, as it only provides punctual readings. In the remaining time, which is not monitored by measurements, it is assumed that the plant parameters do not change seriously. In some cases, the manual checks (e.g. ashing) also take a relatively long time, which leads to longer reaction times.

Thus, a multitude of disadvantages result from the previous approaches. Since impregnates or surface coatings on carrier boards are multi-parameter systems, the determination of all parameters is associated with a large loss of time as well as an increased loss of material and production time. In some cases, only selective tests are possible.

SUMMARY OF THE INVENTION

It is an object underlying the proposed solution to provide a measuring method with which a multitude of parameters can be determined by a single measuring head ("multi measuring head"). This multi measuring head should be flexibly applicable for paper-like, particle-like or board-like materials as continuous material web or formatted material.

This object is achieved by a method with features as described herein.

Thus, a method is provided for simultaneously determining a plurality of parameters, in particular at least two, three or four parameters, of at least one resin layer applied to at least one carrier material by recording and evaluating at least one NIR spectrum in a wavelength range between 500 nm and 2500 nm, preferably between 700 nm and 2000 nm, more preferably between 900 nm and 1700 nm, using at least one NIR measuring head, in particular at least one NIR multimeter head.

NIR radiation is generated and directed onto the carrier material sample to be analysed, on which one or more resin layers are deposited, where the NIR radiation interacts with the components of the sample and is reflected or scattered. An NIR detector captures the reflected or scattered NIR radiation and produces an NIR spectrum that contains the desired chemical information of the sample. In this measurement, a large number of individual NIR measurements are carried out in one second, so that statistical validation of the measured values is also ensured. The NIR spectroscopy together with the multivariate data analysis (mentioned below) offers a possibility to establish a direct relationship between the spectral information (NIR spectra) and the parameters of the applied resin layer to be determined.

The present method takes advantage of the fact that the NIR radiation does not penetrate through the carrier material but is already largely reflected or scattered at the surface of the carrier material. In the present process, the NIR radiation therefore penetrates through the applied resin layer and is largely reflected or scattered at the surface of the carrier material located under the resin layer. The reflected or scattered NIR radiation is detected by the NIR detector, and the determined NIR spectrum is used to determine the desired parameters. Parts of the NIR radiation are thus characteristically absorbed by the resin layer and the other materials therein when passing through the resin layer twice (on the way to the surface of the carrier material, and after reflection or scattering on this surface of the carrier material on the way back), whereby the layer-specific NIR spectra of the reflected or scattered radiation are generated. The measurement and evaluation of the generated NIR spectra serves to determine certain parameters that characterise this resin layer and the other materials contained therein.

In one embodiment, the parameters to be determined simultaneously are selected from a group comprising the amount of applied resin layer, the degree of curing and degree of cross-linking of the applied resin layer, the moisture content of the applied resin layer, the abrasion resistance and if applicable amount of abrasion-resistant particles or other solids scattered on the resin layer.

Accordingly, the present method can be used to simultaneously determine the amount and/or the degree of cross-linking and/or the degree of curing and/or the moisture content of the applied resin layer and/or the amount and/or abrasion resistance of abrasion-resistant particles or other solids scattered on the resin layer. Preferably, the four parameters quantity, cross-linking and moisture content of the applied resin layer and quantity of abrasion-resistant particles scattered on the resin layer are determined simultaneously. However, it is also possible to determine only the two parameters quantity and moisture content of the applied resin layer or the three parameters quantity, cross-linking and moisture content of the applied resin layer simultaneously or other combinations from the group of the previously mentioned parameters.

Thus, a method is provided in which the above-mentioned parameters can be determined from a single NIR spectrum or the reflection or scattering of NIR radiation by using an NIR measuring head, namely by means of a non-contact measurement. For differential measurements, it is also possible to use several measuring heads in one production line. In an advantageous embodiment, the data determined with the measuring head or heads is used directly for plant control or regulation. In addition, in a further advantageous embodiment, the storage of the data enables quality control to be improved. The stored data can also advantageously contribute to the evaluation of plant tests, e.g. commissioning of a plant during new plant or after maintenance or repair, or for in-situ testing purposes of new production or measuring processes. Due to the immediate availability of the measured values and the high measuring frequency, very close monitoring or control or regulation of the systems is made possible.

The present method enables the provision of the measured values in a short time (online, preferably without disturbing time delay) compared to conventional (known) measuring methods. The measurement data can be used for quality assurance, research and development, process management, process regulation, process control, etc. The measurement process does not reduce the production speed, etc. Basically, it improves the monitoring of production. In addition, downtimes due to quality determinations and plant adjustments are also reduced.

The advantages of the present method are manifold: non-contact multi-parameter determination ("real time" or "real-time" measurement) with significantly reduced time delay in the evaluation of the measured parameter values; improved plant control or regulation, reduction of rejects, improvement of the quality of the products manufactured on the plant, improvement of the plant availability.

In one embodiment, the present method comprises the following steps:
Recording of in each case at least one NIR spectrum of several reference samples with in each case different values of the desired parameters using at least one NIR detector in a wavelength range between 500 nm and 2500 nm, preferably between 700 nm and 2000 nm, in particular preferably between 900 nm and 1700 nm;
Determination of the desired parameters of the said reference samples by non-spectroscopic methods;
Assignment of the parameters determined for the reference samples to the recorded NIR spectra of the said reference samples;
Creation of a calibration model for the correlation between the spectral data of the NIR spectra and the associated parameter values using multivariate data analysis;
Applying at least one resin layer to at least one side of the carrier material;
Recording at least one NIR spectrum of the resin layer applied to the carrier material using the at least one NIR detector in a wavelength range between 500 nm and 2500 nm, preferably between 700 nm and 2000 nm, in particular preferably between 900 nm and 1700 nm;
Determine the desired parameters of the resin layer applied to the carrier material by comparing the NIR spectrum recorded for the resin layer with the calibration model created.

Accordingly, reference samples of the carrier material coated with a resin are first provided. It is essential that the reference sample is similar to the sample to be measured, i.e. in particular the resin layer of the reference sample has the same composition as the resin layer to be measured. The similarity of the sample to be measured and the reference sample is particularly important when using liquid resin layers with additives such as flame retardants, fibres and other additives.

At least one NIR spectrum is recorded from these reference samples in a wavelength range between 500 nm and 2500 nm, preferably between 700 nm and 2000 nm, in particular preferably between 900 nm and 1700 nm.

These reference samples are also subjected to non-spectroscopic analysis to determine the desired parameters, i.e. amount, degree of cure, degree of cross-linking, degree of moisture of the amount of resin applied to the carrier material and amount of particles applied and their abrasion resistance (or a selection of these parameters). The non-spectroscopic analyses are described in detail below for each of the parameters mentioned.

A mean value is formed from the parameters for the reference samples determined in each case by means of the non-spectroscopic analysis, which is then assigned to the respective recorded NIR spectra of these reference samples, and a calibration model is created for the relationship between the spectral data of the NIR spectra of the reference samples and the associated parameter values by means of a multivariate data analysis; i.e. an NIR spectrum of the reference sample corresponds to each parameter value of the reference sample. The calibration models created for the various parameters are stored in a suitable data memory.

At least one resin layer is then applied to at least one side of the carrier material and at least one NIR spectrum of the resin layer applied to the carrier material is recorded. The desired parameter of the resin layer applied to the carrier material can then be determined by comparing the NIR spectrum recorded for the resin layer with the calibration model created.

It is thus possible to simultaneously determine several parameters of interest of the resin layer applied to a carrier material from a single NIR spectrum determined for the sample to be measured by an automated comparison or alignment with the calibration models created for the respective parameters.

It makes sense to compare and interpret the NIR spectra over the entire recorded spectral range. This is advantageously carried out with a multivariate data analysis (MDA) known per se. In multivariate analysis methods, several statistical variables are typically examined simultaneously in a manner known per se. For this purpose, the number of variables contained in a data set is usually reduced without simultaneously reducing the information contained therein.

In this case, the multivariate data analysis is carried out using the partial least squares regression (PLS) method, which allows a suitable calibration model to be created. The evaluation of the data obtained is preferably carried out with suitable analysis software, such as the analysis software SIMCA-P from Umetrics AB or The Unscrambler from CAMO.

In another embodiment, it is intended to use spectral data from the NIR spectral range between 1450 and 1550 nm for the creation of the calibration model, which are pre-treated by means of suitable mathematical methods and then fed to the multivariate data analysis.

The significance of a wavelength for the prediction of resin layer parameters, such as the amount of resin, from the NIR spectrum is shown with the help of the regression coefficients. Here, the regions with large coefficient amounts have a strong influence on the regression model. Thus, the representation of the regression coefficients in a PLS regression model for the determination of the amount of resin or the resin content shows that the wavelength range between 1460 nm and 1530 with a maximum at 1490 nm (absorption band of the amino groups of the resin) is most important for the calculation of the model, as the amounts of the regression coefficients are largest here. The other ranges in the spectrum have less information content in relation to the NIR measurement, but still help to take into account or minimise the other information or interfering influencing variables (such as transparency of the layer, surface properties of the resin layer or the carrier material, etc.).

To eliminate interfering influences (such as the nature of the surface of the carrier material, the colour of the samples, light scattering from solid particles or other additives, etc.), it is necessary to process the spectral data using mathematical pre-treatment methods (e.g. derivative data pre-treatment, standardisation according to SNVT (Standard Normal Variate Transformation), multiplicative signal correction (EMSC, Extended Multiplicative Signal Correction, etc.). In this process, the baseline effects, which are mainly caused by the different colour of the samples, are removed from the spectra, overlapping bands are separated from each other and the dependence of the light scattering on the carrier material surface or on the solid particles in the coating is taken into account. If, for example, the amount of resin applied to untreated surfaces of carrier materials such as wood-based boards is to be determined, the data pre-treatment is preferably carried out to reduce the light scattering from the rough surface of the carrier material. When measuring on decorative layer, the focus of calibration and data pre-treatment is on removing baseline shift.

From the pre-treated data, a calibration model is developed using multivariate data analysis, which includes all decors used in the calibration.

Accordingly, the comparison and interpretation of the NIR spectra are preferably carried out in the spectral range between 1450 and 1550 nm using multivariate data analysis MDA. In multivariate analysis methods, several statistical variables are typically examined simultaneously in a manner known per se. For this purpose, the number of variables contained in a data set is reduced without simultaneously reducing the information contained therein.

In a preferred embodiment, a paper layer is used as the carrier material. For example, overlay papers, decorative papers or kraft papers are used as paper layers. Overlay papers are thin papers which have typically already been impregnated with a conventional melamine resin. There are also overlay papers available in which abrasion-resistant particles, such as corundum particles, are already mixed into the resin of the overlay in order to increase the abrasion resistance. Décor papers are special papers for surface finishing of wood-based materials, which allow a high variety of decors. In addition to the typical imprints of various wood structures, more extensive imprints of geometric shapes or artistic products are available. In fact, there is no restriction in the choice of motif. To ensure optimal printability, the paper used must have good smoothness and dimensional stability and also be suitable for penetration of a necessary synthetic resin impregnation. Kraft papers have a high strength and consist of cellulose fibres to which starch, alum and glue are added to achieve surface effects and strength increases.

In a preferred embodiment, the carrier material is partially or completely impregnated with the resin, whereby the resin penetrates or penetrates into the carrier material. Impregnation takes place in particular when paper layers are used as the carrier material. In the present context, the term "impregnation" is to be understood as a complete or partial impregnation of the paper layer with the resin. Such impregnations can be applied, for example, in an impregnation bath, by rolling, by screen rolling, by doctoring or also by spraying.

In a further embodiment of the present carrier material, it may also be provided that the resin layer does not penetrate into the carrier material, but rather is applied to the surface of the carrier material. This is particularly the case in the case of using a carrier board as the carrier material. In this case, the at least one precured resin is arranged on at least one surface or one side, i.e. top side and/or bottom side, of the carrier board. A surface is understood to be a single- or multi-layer structure on the carrier material.

In the case of a carrier board as carrier material, this is preferably a board made of a wood material, plastic, a wood material-plastic mixture or a composite material, in particular a chipboard, medium-density fibreboard (MDF), high-density fibreboard (HDF), rough chipboard (OSB) or plywood board, a cement fibreboard, gypsum fibreboard or a WPC board (Wood Plastic Composites) or an SPC board (Stone Plastic Composite).

The surface of the carrier material can be surface-treated, e.g. in the case of a wood-based carrier board, the surface can be sanded or non-sanded and provided with a press skin. In the case of a plastic carrier board, the surface may be corona treated.

Accordingly, the applied resin layer can be in the form of a liquid overlay on a carrier board or as a partial or full impregnate of a paper layer.

The resin layer to be applied to the carrier material consists of a formaldehyde-containing resin, preferably a melamine-formaldehyde resin, a urea-formaldehyde resin or mixtures of both. The solids content of the resin layer is between 30 and 80 wt. %, preferably between 50 and 65 wt. %.

In a variant of the present method, the liquid resin is applied in an amount between 50 and 150 g/m$^2$, preferably between 60 and 100 g/m$^2$, more preferably between 70 and 80 g/m$^2$ to the surface of the carrier material, especially in the case of wood-based boards. In the case of paper layers, the resin application is in a range between 200 to 400%, preferably 300%.

As already indicated, the carrier material can be provided with a decor. This can be a decorative paper layer or a decorative layer applied to a wood-based p by direct printing.

In the case of applying the resin layer to a decorative layer, an additional step in the creation of the calibration model is useful. Accordingly, in a further variant of the present method, the spectral data from the NIR spectral range between 1450 and 1550 nm used for the creation of the calibration model are divided into at least three groups after pre-treatment using suitable mathematical methods, each corresponding to a decor with a similar colour shade, and then fed to the multivariate data analysis.

The spectral data is preferably divided into a first group for a decor with a light tone, a second group with a medium tone and a third group with a dark tone.

Accordingly, in this embodiment of the present method, in addition to the mathematical pre-treatment of the NIR spectra, which does not completely eliminate the decor effect, the reduction of the decor-related effect is performed by dividing the samples into groups with similar decor colour.

For this purpose, all decors used in the calibration are divided into three groups according to their colour tone. Group 1 contains light decors and group 2 medium decors. In group 3, calibration samples of the dark decors are grouped together. By dividing the entire model into three group models according to the colour tone of the decors produced, the systematic (decor-dependent) deviation can be reduced to <5%, which leads to an increase in the accuracy of the online measurement. At the same time, not every decor produced on the line has to be recorded in the DCS regression model. For the NIR measurement of the application quantity on the HDF boards with different decors, it is sufficient to develop a regression model from a few representatives of each decor group, which can be applied to the entire group.

The routine monitoring of the application quantity of the liquid resin layer (overlay) at the production line can be carried out with the corresponding group model depending on the decor produced. For this purpose, the groups of decors formed are expanded by the remaining decors that were not used in the calibration with regard to their colouring.

As indicated above, the resin layer may have abrasion-resistant particles, glass beads, natural and/or synthetic fibres and other additives.

The abrasion-resistant particles used to increase wear resistance preferably comprise corundum (aluminium oxides), boron carbides, silicon dioxides, silicon carbides, the use of corundum being particularly preferred. In one embodiment, the amount of scattered abrasion-resistant particles is 10 to 50 $g/m^2$, preferably 10 to 30 $g/m^2$, more preferably 15 to 25 $g/m^2$. For example, 14 $g/m^2$ or 23 $g/m^2$ of abrasion-resistant particles can be scattered.

The preferred glass beads have a diameter of 50-100 μm, preferably 60-80 μm. The application amount of the glass beads, when applied together with the third resin layer, is 1-5 $g/m^2$, preferably 2-4 $g/m^2$, more preferably 3 $g/m^2$.

As noted above, the reference samples are measured or determined both spectroscopically and non-spectroscopically in order to assign the parameters to the recorded NIR spectra of the reference samples.

Depending on the parameter, different non-spectroscopic analysis methods are used.

Amount of Resin Applied:

A common method for determining application quantities is weighing. The carrier material is coated with the coating medium in the application unit and the application quantity is then determined by measuring the difference in weight.

Moisture of the Applied Resin Layer:

The Darr method is the most accurate method for determining moisture (especially wood moisture), whereby a sample is dried at 103+/−2° C. for 24 hours in a drying oven. Moisture is defined as the ratio of the weight of water contained in the material to the weight of the absolutely dry material (Darr weight). Moisture is thus the ratio between wet weight and dry weight (Darr weight).

Degree of Curing of the Applied Resin Layer:

Curing is determined by the so-called acid test. Here, the surface is exposed to a diluted mineral acid (4 molar hydrochloric acid) for a defined period of time. Subsequently, the change in gloss level and/or colour is assessed. The less loss of gloss/colour is observed, the stronger the hardening.

Degree of Cross-Linking of the Applied Resin Layer:

The degree of cross-linking of partially cross-linked pre-condensates or polycondensates (also known as partially cross-linked, still partially soluble B-state) is determined using the VC test (Volatile Compound Test), in which not only water but also a small amount of formaldehyde is split off from the synthetic resins. For the VC test, a sample (usually 10×10 cm) is weighed and dried at 105° C. for 5 minutes. After cooling, the sample is weighed again. Then, starting from the final weight, the loss of mass is determined and given as a percentage value. The previously determined paper weight serves as the basis for the determination of the resin coverage in percent ((final weight−paper weight/paper weight)×100).

Amount of Scattered Abrasion-Resistant Particles:

This can be determined indirectly via the abrasion resistance of the applied resin layer. The abrasion resistance of cured protective coatings, e.g. on laminate floors, is possible according to DIN EN 13329:2017 (D). Here, the resistance of the top layer or wear layer against abrasion is tested. Samples (e.g. in the size 10 cm×10 cm) are cut out of the board or sample to be tested. The samples are divided into eight equally sized segments (octants) with a pen. These specimens are clamped in a testing device on which there are two swivelling arms with movable friction rollers and a weight (500 g). The friction rollers are covered with standardised abrasive paper. The clamped samples rotate under the friction wheels. Every 200 revolutions, the abrasive paper is changed and the wear of the surface is tested. The test is completed when the carrier material (printing base paper, primer) is visible in five octants of the test specimen, each 1 mm in size$^2$. The number of revolutions necessary to expose the decoration is indicated as the result.

The present method is carried out in a production line comprising at least one NIR multimeter head, preferably at least two NIR multimeter heads, and at least one control system. Such a production line may be a production line for the manufacture of material boards or an impregnation line for paper layers.

The control system of the production line comprises at least one computer-aided evaluation unit (or processor unit) and a database. In the evaluation unit, the NIR spectrum measured for the product (i.e. carrier material with applied resin layer) is compared with the calibration models created for the individual parameters. The parameter data determined in this way are stored in the database.

The data determined with the present spectroscopic method can be used to control the production line. The parameter values of the NIR multi-measurement head measured without contact ("actual values") can be used directly and in "real time" for the control or regulation of the relevant plant, as already described, for example by storing the actual values measured and stored in the database, e.g. a relational database, and comparing them with target values of these parameters existing there. The resulting differences are then used to control or regulate the production line.

A computer-implemented method and a computer program comprising instructions which, when executed by a computer, cause the computer to execute the computer-implemented method, are provided for balancing and controlling the production line. The computer program is stored in a memory unit of the production line control system.

As mentioned, the production line may be designed for coating material boards. In one embodiment, such a production line may have the following structure:

- at least one first application device for applying a first resin layer to the upper side and/or lower side of the material board,
- at least one device arranged downstream of the first application device in the processing direction for scattering a predetermined amount of abrasion-resistant particles;
- at least one first drying device arranged downstream of the first application device and scattering device for drying the first upper and/or lower resin layer;
- at least one NIR measuring head arranged downstream of the first drying device in the processing direction, in particular an NIR multi-measuring head, for online determination of parameters on the resin layer arranged on the upper side of the material board;
- at least one second application device arranged behind the first NIR measuring head in the processing direction for applying a second resin layer to the upper side and/or lower side of the material board,
- at least one second drying device arranged behind the second application device in the processing direction for drying the second upper and/or lower resin layer;
- at least one second NIR measuring head, in particular a NIR multi measuring head, arranged downstream of the second drying device in the processing direction, for online determination of parameters on the resin layer arranged on the upper side of the material board;
- at least one third application device arranged behind the second NIR measuring head in the processing direction for applying a third resin layer to the upper side and/or lower side of the material board,
- at least one third drying device arranged downstream of the third application device for drying the third upper and/or lower resin layer; and
- at least one pressing device, in particular a short-cycle press, for pressing the layer structure.

In a preferred embodiment, the production line for carrying out the present process comprises

- at least one third application device arranged after the second drying device in the processing direction for applying a third resin layer to the upper side,
- at least one device arranged downstream of the third application device for scattering a predetermined quantity of glass beads;
- at least one drying device arranged downstream of the third application device and the glass bead scattering device for drying the third upper and lower resin layers;
- at least one second NIR measuring head arranged downstream of the drying device in the processing direction, in particular an NIR multi-measuring head, for online determination of parameters on the resin layer arranged on the upper side of the material board;
- at least one fourth application device arranged behind the second NIR measuring head in the processing direction for applying a fourth resin layer to the upper side and/or lower side of the material board,
- at least one fourth drying device arranged downstream of the fourth application device for drying the fourth upper and lower resin layers; and
- at least one short-cycle press arranged downstream of the fourth drying device.

It is generally possible that further NIR measuring heads are provided in the production line. Thus, an NIR measuring head can be provided after each application and drying device. For example, after application and drying of the last resin layer before pressing, another NIR measuring head can be provided in the production line.

It is also possible to additionally determine the parameters of the resin layer applied to the underside of the material board. In this case, one or more NIR measuring heads would additionally be provided below the material board passing by in the production line, so that the underside of the material boards is illuminated.

The application devices used are preferably application rollers, which enable the layers to be applied to the top side or the underside of the carrier board. Preferably, the wear layer is applied to the top side and the resin layer is applied to the underside of the wood-based board in parallel.

Depending on the requirements of the production line, it is of course possible to vary the number of application devices and drying devices. For example, a cooling turner can be provided downstream of the KT press for cooling the cured wood-based boards.

As mentioned, the production line can be designed as an impregnation plant for paper layers. Such an impregnation line comprises at least one impregnation tank or impregnation dip, optionally a breathing section, a squeegee system/crush roller pair for removing excess resin, optionally a device for scattering abrasion-resistant particles, at least one dryer (e.g. a floating dryer), optionally a grid unit and optionally a second dryer, at least one cooling device (e.g. a cooling roller system) and at least one NIR measuring head arranged downstream of the cooling device in the processing direction, preferably a NIR multimeter head. The NIR measuring head is preferably arranged in such a way that the upper side of the impregnated paper layer is irradiated. In general, however, it is also possible to provide further NIR measuring heads in the impregnation system for measuring the upper and lower side of the impregnated paper layer.

In both embodiments of the production lines (wood-based board, impregnate), the NIR measuring heads are each connected to a control system with an evaluation unit and database for processing and storing the determined NIR data. In case of deviations of the measured actual values from the target values, an automatic adjustment is made by the system control or regulation. Basically, all NIR measuring heads used in a production line supply the actual values measured by them to the central control and evaluation unit, which regulates or anticipates the production process in the event of a deviation of the measured actual values of e.g. a single NIR measuring head from the corresponding target values.

In the case of the impregnation system, for example, if the measured actual values of the parameters deviate from the target values, an automatic control or regulation system changes the squeegee/the squeegee rollers, the spreading quantity and/or the temperature control in the dryer.

In the case of the production line for the manufacture of wood-based boards, if the measured actual values of the parameters deviate from the set values, an automatic adjustment is made by the system control or regulation.

The parameters determined with the present method can be used in many ways for other applications in addition to the direct control of a plant.

Use of AI Systems for Evaluating the Measurement Data, for Controlling and Regulating the Plant and for Quality Control of the Products Manufactured on the Plant:

For the evaluation of the measured parameter values of the respective NIR multi-measurement head stored in the database, methods or systems of artificial intelligence ("AI") can be used. For the evaluation of measured parameter values of the respective NIR multi-measurement head stored in the database, methods or systems of artificial intelligence ("AI" for short) can also be advantageously used, which are characterised in particular by the fact that these systems become increasingly better in their evaluation of these data over the course of time due to the continuous inflow of measurement data and the associated continuous increase in the stored data quantity of the measured parameter values of the NIR multi-measurement head(s) of the plant ("knowledge-based AI systems in the narrower sense") and which, if necessary, also can also recognise and evaluate ("self-learning" AI-based evaluation systems) previously unknown correlations between the individual measurement parameters of the NIR measurement process (and possibly between these "NIR" measurement data and other data obtained elsewhere and made available to the AI system for evaluation) and which can use these new findings for further optimisation of the control or regulation of the plant in order to further optimise the start-up and operation of the plant in terms of efficiency and reliability, or to further increase the quality of the products manufactured on this plant, or to further reduce the number of rejects (defective or lower-quality products).

Use of AI Systems to Predict Failure Probabilities of Components of the Plant or Quality Degradation Probabilities of Products Produced on the Plant:

Furthermore, such AI-based evaluation systems can also be used to make predictions about the future development of the parameter values to be measured and thus statements about the development of the quality of the products or the wear of individual components of the plant, which can be used, among other things, to plan or carry out any maintenance work or repairs "proactively" before, for example, a component actually fails due to wear or before the quality of the products has actually deteriorated to such an extent that they can no longer be sold as rejects.

Use of the Inventive Measuring Method, in Particular Using AI Systems, to Optimise the Start-Up Process of a Plant:

The actual values of the parameters stored for certain product types, which have already been measured with the inventive NIR measuring method for a certain product type on a certain plant, and the associated setpoint values of these parameters, can be used advantageously when starting the production of the already known product type on this plant, in order to set and optimise the parameters of this plant more quickly for the production of the said product type by comparing the newly measured values of these parameters with these already existing data records of these parameters and evaluating the resulting differences in these values.

This time reduction in the start-up of the plant is advantageously further improved by the use of the AI-based system already mentioned, since here it is also possible to react particularly quickly to changes in the starting basis for the production of a certain product type on the plant, if, for example, other raw materials than those previously used are used for the production of said product type (e.g. the wood fibre mixture, the composition of which can change significantly if different fractions of different types of wood (poplar, pine, fir, beech, etc.) and/or recycled waste wood) are used), or the synthetic resin/additive mixtures used, the individual batches of which can vary from manufacturer to manufacturer or the recipes of which can have changed).

This shortening of the start-up time of a line is particularly advantageous when the line is restarted after a repair or after regular maintenance or after taking samples when the line has to be stopped, or especially when a number of smaller batches of certain (different) product types are to be produced.

This can have a particularly positive effect if the plant operator has to produce more and more such smaller batches of different product types one after the other with his plants as a result of a change in the consumption behaviour of the end consumers or the ordering behaviour of the commercial customers of a plant operator and has to cope with a correspondingly large number of associated downtimes of his plant (standstill and start-up times).

With the embodiment of the solution described here, these necessary but undesirable downtimes of the plant can be significantly reduced, with the result that the production of a number of smaller batches of different product types can also be economically viable for the plant operator.

Industry 4.0: Networking of a Plant with a Pool of Other Plants of the Same Type or a Similar Type:

In a further expansion stage, the plants described above can be networked via cable or, more advantageously, via the Internet or telecommunications networks, with other plants of the same or a similar type of the plant operator, which are located, for example, on the premises of the same operating site and/or also at other operating sites of the plant operator, which may be located at other locations in Germany and abroad.

It is also possible to network this one plant of the plant operator or also all other plants (or at least some of these plants) of the same type or similar type of the operator with plants of the same type or similar type belonging to other plant operators.

The basic idea here is to either combine the measurement data of all connected plants in a central (server-based) evaluation unit, which evaluates this data of all connected plants and, as a result of the larger amount of data available, can carry out an even better and faster evaluation of the data and thus make the processes described in the previous chapters even more efficient (faster, better, with higher quality, with more reliable predictions, etc.). This will pay off especially if AI-based evaluation plants are used for this purpose. Instead of a central (server-based) evaluation unit, distributed decentralised evaluation units can also be used, which communicate with each other and can/are allowed to access the data of all or selected plants.

It is also possible to feed and store the measurement data of the individual plants in a cloud application, to which
  the individual evaluation units for individual plants ("local" plant specific evaluation unit/plant) can/are allowed to access and/or
  decentralised evaluation units for all or some plants of a respective plant operator ("cohort-specific" plant operator-specific evaluation unit/plant operator") and/or
  a central evaluation unit that evaluates the individual data of a specific plant of an plant operator on the basis of all data available in the cloud from the plants of all plant operators and communicates the results to the control or regulating unit of this specific plant ("central" plant operator-independent evaluation unit).

The basic idea of the model of a cross-plant and possibly AI-based storage unit of the measurement data (ACTUAL values) of the products to be manufactured and the associated sample or default data/specifications (target values) for these products is therefore to store all this data centrally for all connected plants or NIR multi-measurement heads (preferably while preserving the confidentiality of the data of plants or NIR multi-measurement heads of different (legally unconnected) plant operators). NIR multi-measurement heads of different (legally unconnected) plant operators) and to evaluate the incoming ACTUAL data of a plant on the basis of the relevant stored data of all relevant plants and to send the results of this evaluation back to the control or regulation of the individual plant or to the quality control for this plant. This can be a manned control centre for the control or regulation of the plant and/or the quality control of the products manufactured on the plant. However, it can also be an automated or at least partially automated control centre which either completely or at least partially controls or regulates the plant without human intervention and/or which monitors the quality of the products either automatically or at least partially automatically and intervenes automatically or partially automatically in the control or regulation of the plant or at least triggers a warning signal if the quality of the manufactured products deteriorates.

These evaluation unit or units can be physically separate (e.g. server-based) units, but they can also be virtual units that are also stored in the cloud and e.g. developed, maintained and updated by the cloud operator.

Firewalls and similar devices can be used to ensure that the evaluation is carried out by the evaluation unit or units on the basis of the data fed in from all connected plants (or at least part of them), but that the individual plant operators only have access to the evaluation results that concern their own plants (and only those), so that the confidentiality of the measurement data received and the results of the evaluations is guaranteed.

It is also possible that, for example, the operators of such plants join forces and jointly operate such a storage and evaluation unit, e.g. in the form of a server or a "private cloud", or have it operated by a neutral external service provider on their behalf, which could, for example, be the manufacturer of such NIR multi-measurement heads.

Furthermore, according to the solution, it is possible that not only the measurement data can be stored centrally on a server or in a cloud, and possibly also the evaluation unit, but also that the control and regulation of the individual plants can be controlled or regulated directly from this central server or this cloud, or the control of the quality of the products manufactured on these plants can be monitored centrally, or the plant operators can be informed centrally and preventively about predictions of probabilities of future maintenance and repairs of the individual plants and their components and about future deteriorations in quality.

Particularly advantageously, such a central, possibly AI-based platform for the storage, evaluation, monitoring, prediction and possibly even control and regulation and quality control of such NIR multi-measurement heads or the associated plants could be operated by the manufacturer of the NIR multi-measurement heads and offered as a service to the plant operators.

Alternatively, such a manufacturer of NIR multi-measurement heads could at least offer such a network-capable and possibly AI-based overall system for operating the NIR multi-measurement heads of the plants of a plant operator, which enables storage, evaluation, monitoring, prediction and possibly even control and regulation and quality control of such NIR multi-measurement heads or the plants of the plant operator connected thereto.

Of course, the networked and possibly AI-based systems described here for storage, evaluation, monitoring, prediction and possibly even control and regulation and quality control of such NIR multi-measurement heads or the associated equipment can also be combined with or integrated into other systems of this kind that record and evaluate other parameters, or integrate these other systems.

Such systems can be, for example, special systems for processing incoming orders, for order processing (production planning) and delivery of the ordered/manufactured products, or the logistics systems of material purchasing or goods delivery, or the ERP systems (ERP="Enterprise Resource Planning") already present in modern companies.

BRIEF DESCRIPTION OF THE DRAWINGS

The proposed solution is explained in more detail below with reference to the figures in the drawing using an example of an embodiment.

DESCRIPTION OF THE INVENTION

Figure 1:
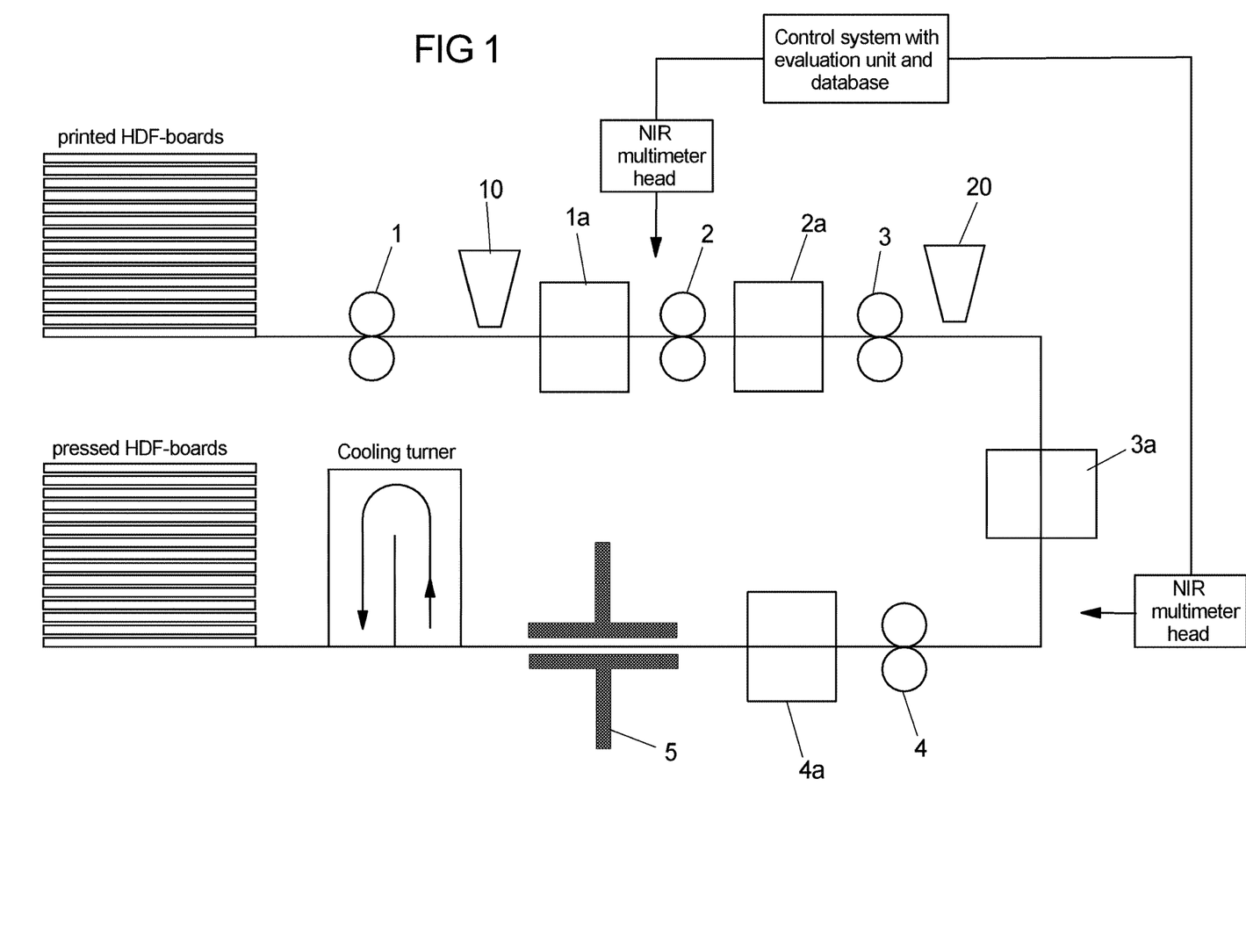
FIG. 1 shows a schematic representation of a production line for the manufacture of a wood-based board

The production line shown schematically in FIG. 1 comprises four double application units 1, 2, 3, 4 for the simultaneous application of the respective resin layer to the top and bottom of the separated printed material boards, e.g. printed HDF boards, as well as four convection dryers 1a, 2a, 3a, 4a arranged behind each of the double application units in the processing direction.

Downstream of the first applicator roller 1, a first scattering device 10 is also provided for uniformly scattering the abrasion-resistant material, such as corundum, onto the first resin layer on the upper surface of the HDF board. Drying of the first resin layer is then performed in the first convection dryer 1a. After the first convection dryer 1a, a first NIR multimeter head is provided.

This is followed by a second double applicator 2 for applying a second resin layer and a second convection dryer 2a for drying the second resin layer.

Downstream of the third double applicator 3 for applying the third resin layer, there may be another scattering device 20 for applying glass beads to the third resin layer followed by a third convection dryer 3a for drying the third resin layer. The scattering device 20 for the glass beads is optional. The glass beads may also be applied together with the third resin layer. After the third convection dryer 3a, a second NIR multimeter head is provided.

After application of the fourth resin layer, which in the case of the fourth resin layer on the top side may contain e.g. cellulose fibres, in a fourth double applicator 4 and drying in a fourth convection dryer 4a, the layered structure is pressed in a short-cycle press 5. The pressed boards are cooled and stored.

It is generally possible that further NIR measuring heads are provided in the production line. For example, after application and drying of the last resin layer before pressing, another NIR measuring head can be provided in the production line (not shown). It is also possible that one or more NIR measuring heads are additionally provided in the production line below the material board being passed by, so that the underside of the material boards is illuminated (not shown).

The two NIR multimeter heads are connected to a control system with an evaluation unit and database for processing and storing the determined NIR data. In the event of deviations from the target values, the production conditions are automatically adjusted by the system control or regulation.

Figure 2:
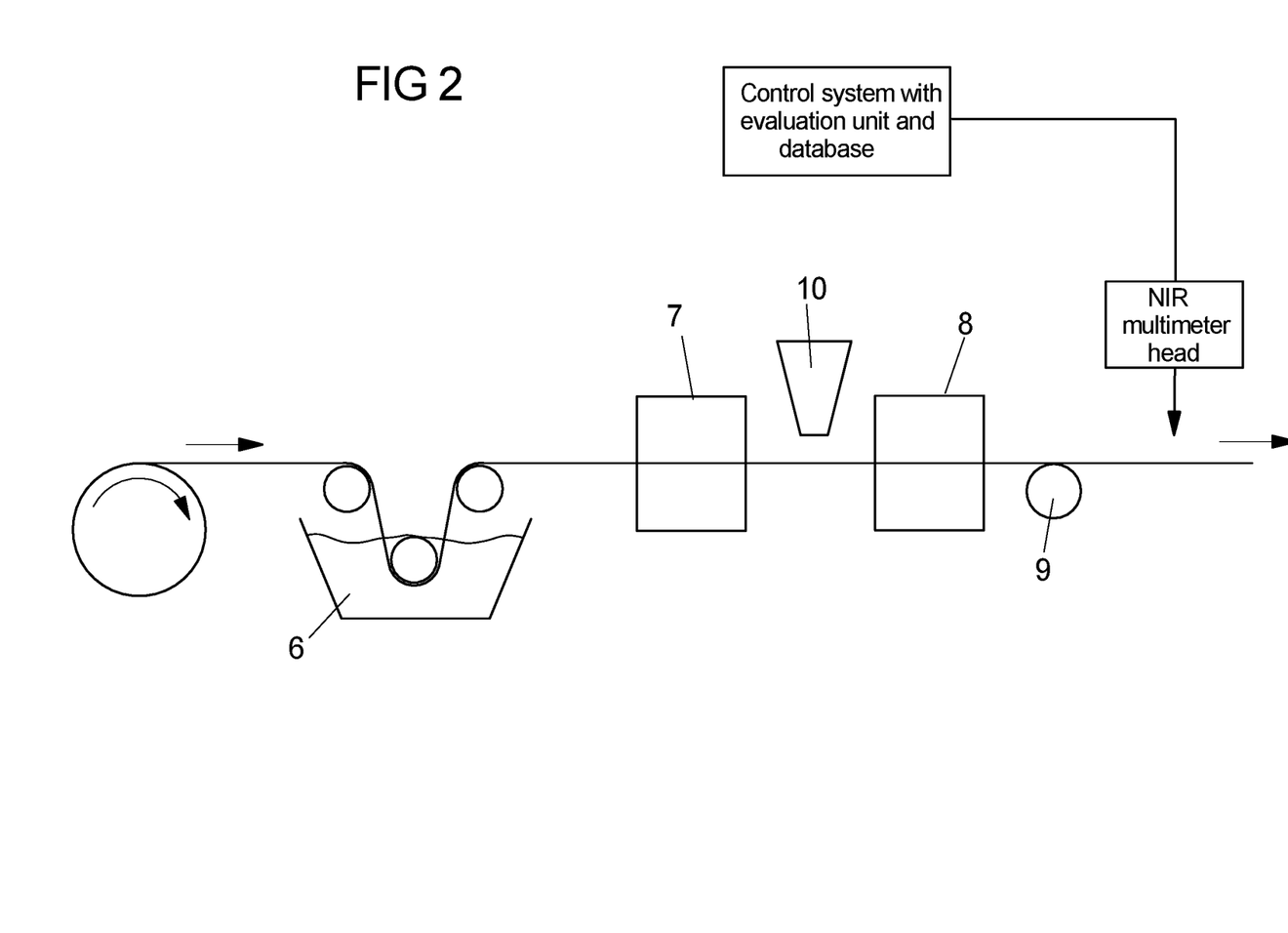
FIG. 2 is shows a schematic representation of an impregnation plant.

FIG. 2 shows the schematic structure of an impregnation machine for paper layers. This comprises at least one impregnation bath 6, a squeegee system or pair of squeegee rollers 7 for removing excess resin, a device for scattering abrasion-resistant particles 10, a floating dryer 8, a cooling roller system 9 and an NIR multimeter measuring head arranged downstream of the cooling device. Generally, it is also possible to provide further NIR measuring heads in the impregnation system for measuring the top and bottom side of the impregnated paper layer (not shown).

Here, too, the NIR multimeter head is connected to a control system with an evaluation unit and database for processing and storing the determined NIR data. In the event of deviations from the target values, the production conditions are automatically adjusted by the system control or regulation.

Example 1: Determining the Amount of Resin Layer Applied to a Wood-Based Board Provided with a Decor Create a Reference Sample and Calibrate:

The calibration of the NIR measuring system for the on-line determination of the application quantity is carried out as follows.

Several 50 cm×50 cm samples are made from an HDF board. The back and edges of the samples are sealed with aluminium tape to prevent moisture loss during drying. A sample is coated with a resin solution from above using an applicator roller. The amount applied is determined by weighing out the samples before and after coating. The sample is then dried in a convection dryer at approx. 190° C. for approx. 15 seconds and then measured with the NIR spectrometer. The calibration samples are measured with the NIR measuring system DA 7400.

The measurement is started manually and takes approx. 10 s. During this process, the reference boards are moved by hand in a circle under the measuring head. By varying the application quantity, calibration is achieved over a wide range of application quantities from 30 $g/m^2$ to 145 $g/m^2$. In this way, several reference samples are measured.

A calibration model is created from the reference spectra, which is used to determine the application amount of an unknown sample. The calibration model is created using multivariate data analysis. This is done with suitable analysis software, e.g. with the previously mentioned analysis software The Unscrambler from the company CAMO.

To create the calibration model, spectral data from the NIR spectral range of the liquid resin between 1450 and 1550 nm are used, which are first pre-treated using suitable mathematical methods and then fed to the multivariate data analysis.

The software programme used enables special pre-treatment techniques of the spectral data to minimise various interfering factors on the measurement such as surface condition of the samples, infrared inactive fillers in the coating or different colours of the samples and others.

The colour influence in the case of determining the amount of liquid resin on decor layers on the NIR measurement can additionally be solved by forming decor groups that have a similar colour division. For this purpose, all decors used in the calibration are divided into three groups according to their colour shade. Group 1 contains light decors and group 2 medium decors. Calibration samples of dark decors are grouped in group 3. By dividing the entire model into three group models according to the colour of the decors produced, the systematic (decor-dependent) deviation is reduced to <5%, which leads to an increase in the accuracy of the online measurement. At the same time, not every decor produced on the line has to be recorded in the DCS model. For the NIR measurement of the application quantity of the resin on the HDF boards with different decors, it is sufficient to develop a PLS regression model from a few representatives of each decor group, which can be applied to the entire group.

Determining the Application Amount of Liquid Resin on a Decorative Layer:

Calibration is carried out by recording the NIR spectra of several reference samples (weighing boards 50 cm×50 cm) printed with different decors and with a known amount of resin. The samples are coated from above with a resin solution (application quantity between 10 $g/m^2$ and 150 $g/m^2$) using an applicator roller. From the calibration spectra obtained, a PLS regression model is created for each deco group, which is then used for the on-line measurement at the plant.

For the on-line measurement of the application amount in the process, models for each decor group are installed in the NIR measuring system.

Example 2: Determining the Moisture Content of the Resin Layer Applied to a Wood-Based Board Melamine-formaldehyde resin layers are applied to wood-based boards. These serve as reference samples. NIR spectra are then recorded in a wavelength range between 900 and 1700 nm. For the recording of the NIR spectra, a NIR measuring device from Perten, for example, is used. The measuring head bears the designation DA 7400.

Suitable calibration models are created for further evaluation of the NIR spectra. Thus, a first calibration model is created for the NIR spectra of the reference samples (without the Darr sample), which was determined using Partial Least Squares (PLS) regression.

This model is used to determine the residual moisture in the Darr sample. Using the first calibration model, a moisture content for the Darr-dried sample is calculated, for example, by the previously mentioned analysis programme SIMCA-P from Umetrics AB. For this purpose, the Partial Least Square (PLS) regression is used to create a calibration function that describes a dependency between spectrum and moisture content. For the moisture content of the Darr-dried sample, a moisture content is calculated by the analysis programme using the calibration function created.

Subsequently, the amount of moisture content for the Darr-dried sample is added to all used moisture values of the calibration samples or reference samples and the moisture content of the Darr-dried sample is set equal to zero. From these new calibration values of the moisture and the measured spectra, a second calibration model is created with the help of Partial Least Squares (PLS) regression, which is now suitable for creating a relationship between the measured NIR spectra of a resin layer to be measured on a carrier board and the NIR spectra of reference samples with known moisture content.

Using the second PLS calibration model of linear regression, the NIR spectrum determined for a sample is then assigned to a specific moisture content.

Example 3: Determining the Degree of Curing of the Resin Layer Applied to a Wood-Based Board Create a Reference Sample and Calibrate:

Calibration is performed by taking an NIR spectrum of a cured sample, which is then tested for curing using acid tests, and is carried out as follows.

HDF boards (207 cm×280 cm) printed with various decors are coated from above with liquid melamine-formaldehyde (MF) resin or with an overlay paper impregnated with MF resin on the coating line by means of an application roller and then pressed in a short-cycle press at 190-210° C. and approx. 40 bar for 8 to 36 seconds. During this process, the protective layer is cured. By varying the pressing time and pressing temperature, samples with differently cured protective layers are obtained.

When calibrating for an online measurement, the NIR spectra are recorded a few seconds after the pressing process directly on the production line. Subsequently, the board is tested for curing by means of an acid test at the points where the NIR spectra were recorded. An average value is calculated from the results of the acid test for one board and assigned to the spectrum of this board.

In this way, several reference spectra of differently cured boards with different colour decors (for calibration of the online measurement) are recorded.

The acid test is carried out as follows. Three drops of 4 M HCl are added to a board that has cooled down to room temperature. After 25 minutes of exposure time, the acid is rinsed off with water. Based on the visual and haptic assessment of the surface at the point of application, a statement is made about the quality of the curing.

For calibration, the result of the test is correlated with spectral data. The calibration model is created using multivariate data analysis. This is done with suitable analysis software, e.g. The Unscrambler from CAMO. This programme makes it possible, among other things, to minimise various interfering factors on the measurement, such as surface properties of the samples, infrared-inactive fillers in the coating or different colours of the samples, by means of special pre-treatment techniques of the spectral data. The colour influence on the NIR measurement can, as described before, be solved additionally by the formation of deco groups, which have a similar colour division.

A calibration model is created from the reference spectra, which can be used to determine (predict) the curing of an unknown sample.

Online NIR measurement then directly predicts the result of the acid test or quality of the cure. Online measurement of the degree of cure of a resin coating:

With the online determination of the curing, the NIR measurement or recording of the NIR spectra is carried out directly at the production plant, immediately after the curing of the resin coating. After creating a calibration model, this is installed in the measuring device. As the samples pass under the measuring head, several NIR spectra are recorded from the coating. The calibration model is used to calculate an average cure (acid test) of the coating from the recorded spectra. In this way, each board is tested for the quality of the curing during production.

Example 4: Determining the Degree of Cross-Linking of Impregnates

Create a Reference Sample and Calibrate:

In the case of impregnated papers, impregnates in different drying states are first measured with the NIR measuring head for the calibration of the NIR measurement. For this purpose, impregnates are taken from an impregnation channel that are produced at different speeds. The speeds of the impregnation channel are varied upwards and downwards around the optimum known per se. Then the samples are measured by NIR measuring head and then the VC value is determined in the oven. After five minutes of drying, the cured final state (C-state) is reached. After drying in the oven, the samples are measured a second time using the NIR measuring head. This measurement provides the end point of the drying.

After correction of the baseline shift, the spectra show change in absorption intensity of the NIR bands at about 1450 nm (water) and at about 1490 nm (N—H groups).

One can then create a correlation between the VC values and the NIR spectra. The creation of the calibration model describing the correlation between the NIR spectra and the corresponding VC values is done with the multivariate regression methods (e.g. with MLR, PCR or PLS regression methods, etc.). The evaluation is carried out over the entire spectrum. The longer the sample is dried in the oven, the higher the degree of cross-linking. Samples can also be measured that have a higher VC value than usually aimed for. By testing these under-dried samples, improved control of the impregnation channel (dry channel) can also be achieved. The under-dried samples have a methylol group content that is above the optimum, while the over-dried samples have a methylol group content that is below the optimum. Thus, by recording the NIR spectra in combination with visualisation, it is possible to control the channel based on the methylol group content. With these data, after calibration for the different resin and paper systems, a basic prediction can be made about the state of the curing.

The tests on the curing state can be carried out directly at the outlet of an impregnation system. The NIR measuring head delivers several hundred measured values per minute, making continuous process monitoring possible. For quality tests in the warehouse, a mobile measuring device can be used.

The NIR measurement of the cross-linking can be carried out directly at the production line (online measurement) with a mobile device (e.g. with the previously mentioned DA 7400 device from Perten) or in the laboratory (off-line measurement) with a stationary device (e.g. with the DA 7250 device from Perten).

Measurement of the Degree of Cross-Linking:

In an impregnation channel, an overlay (paper weight: 25 g/m$^2$) is impregnated with a mixture of melamine resin and corundum. The total application quantity is approx. 75 g/m$^2$, of which approx. 55 g is melamine resin. The impregnation channel is run at different speeds. Samples are taken from the individual speed variants in such a test and measured with the help of the NIR measuring head. They were then examined for their VC value. VC values of 3.0 to 8% were found. All samples were measured a second time with the NIR measuring head after drying.

A correlation was then created from the spectra and the VC values, which allowed a prediction of the VC value on other overlay patterns.

This process can of course also be used for systems where the pre-cured resins are applied directly to printed or nonprinted wood-based boards. The same problems arise with these boards as with impregnated papers. Here, too, it is important to know the curing state of the resin on the board. This applies both to a linked production line, in which the resin is applied and dried before further processing in a short-cycle (KT) or continuous press (Conti press), and to a non-linked production line, in which the resin is applied and dried before the intermediate product is processed further at a later time. In the case described, the determination of the cross-linking state is all the more important because, in contrast to impregnated papers, a quality determination of the parameters usually to be determined is otherwise hardly possible. By means of a measurement carried out directly on the production line, an adjustment of the production parameters can be made immediately in case of deviations from the target state. These can be, for example, the feed rate and the dryer setting (air temperature, air speed and air flow). Finally, it is possible to control the dryers via the curing state of the synthetic resin.

Example 5: Determining the Abrasion Resistance

Create a Reference Sample and Calibrate:
  a) Calibration in the case of an already cured wear layer is carried out by recording an NIR spectrum of a carrier board provided with an already cured wear layer as a reference sample in analogy to the procedure described under b) directly below.
  b) Calibration in the case of a not yet hardened wear layer is carried out by recording an NIR spectrum of a carrier board provided with a wear layer but not yet pressed as a reference sample, which is tested for abrasion resistance after the pressing process.

For this purpose, a printed HDF board is evenly coated with liquid melamine-formaldehyde resin with glass and corundum particles from above on a coating machine by means of an applicator roller via several roller applicators with intermediate drying. The amount of solid particles in the total coating varies depending on the abrasion class produced and ranges from 10 to 50 g/m². The solid particles used have a diameter between 10 and 100 μm.

Before the pressing process in the KT press, an NIR spectrum is recorded from the coated carrier board in a predetermined section of the carrier board.

The board is then pressed in a short-cycle press at 200° C. and 40 bar for approx. 8 seconds. During this process, the protective layer is completely hardened. After the board has cooled down, several (especially four) 10 cm×10 cm samples (P1-P4) are taken for the abrasion resistance test. The samples for the abrasion resistance test are taken in the area of the board where the NIR spectrum was recorded.

The abrasion values are determined according to the procedure in DIN EN 15468:2006 (directly coated laminate flooring without overlay) with reference to DIN EN 13329: 2017 and an average value is formed from the abrasion values and assigned to the measured NIR spectrum. In this way, several reference spectra of coated boards with different colour decors are recorded. A calibration model is created from the reference spectra, which can be used to determine or predict the abrasion resistance of an unknown sample. The calibration model is created using multivariate data analysis. This is done with suitable analysis software, e.g. with the previously mentioned analysis software The Unscrambler from the company CAMO.

The NIR spectrum was recorded in a wavelength range between 900 and 1700 nm. For the recording of the NIR spectra, the aforementioned NIR measuring device from Perten was used, whose measuring head is called DA7400. Online Measurement of a Resin Coating with Wear Particles:

The measurement is carried out by recording NIR spectra of a synthetic resin layer (melamine resin) that is pre-dried but not yet post-cured in a short-cycle press on a carrier board (e.g. an HDF board), which is tested for its behaviour to abrasion stress after the pressing process. By measuring a large number of samples both spectroscopically and according to the standard for determining abrasion resistance, a dependency was previously determined via a calibration model.

NIR spectra of three samples with the same amount of resin applied but without corundum as wear particles or with different amounts of corundum are measured. These show different results when testing the behaviour against abrasion stress. The samples were tested in accordance with DIN15468 and DIN EN 13329: 2017—Laminate flooring—Elements with a top layer based on aminoplastic thermosetting resins, Annex E. For sample 1 (120 μm resin layer without corundum, upper dashed curve in the DIN standard), a wear class lower than AC2 was determined in the test of the behaviour against abrasion stress, for sample 2 (120 μm resin layer with 20 g corundum/m², lower continuous curve in the DIN standard) a wear class AC 2, and for sample 3 (120 μm resin layer with 40 g corundum/m², middle dot-dash-shaped curve in the DIN standard) a wear class AC 3. Samples 2 and 3 differ in the amount of wear-inhibiting particles.

In the NIR spectra determined, the chemical information of the absorption is superimposed by the scattering of the NIR light by the solid particles. In addition to the slight baseline shift, a slight change in the shape of the spectra can be seen, which is due to the scattering by the solid particles. With increased solid content, the scattering increases, especially at shorter wavelengths.

When creating a regression model, in addition to chemical information on the absorption, the scattering of the NIR radiation on the solid particles is also used to determine the behaviour in relation to abrasion stress. Accordingly, when creating the regression model, the spectroscopic data are related to the values obtained when testing the behaviour against abrasion stress.

Since the scattering of the NIR light by the solid particles makes a significant contribution to determining the behaviour in relation to abrasion stress, in addition to the main factors that explain the chemical variance of the samples, other main factors are also taken into account that describe, among other things, the morphology of the coating. The main factors here are the peaks in the spectrum, the scattering and the baseline shift.

Example 6

In an impregnation channel, a 30 g/m² overlay is impregnated with a melamine resin (solids content: 55 wt %) in a first step in an impregnation bath. The working width of the dryer is 2070 mm and the feed rate is approx. 50 m/min. The melamine resin contains the usual additives such as hardeners, wetting agents, release agents, etc. Behind the impregnation tray there is a breathing section and a squeegee system or a pair of squeegee rollers with which excess resin is removed. The target resin coverage is approx. 300%. A scatterer is placed in front of a float dryer, with which approx. 20 g corundum/m² is scattered into the still damp melamine resin. The corundum has a grain size of F220 according to the FEPA standard. The web is then dried to a residual moisture content of approx. 6% in the flotation dryer. Behind the float dryer is a chill roll system that cools the impregnate to room temperature. Behind the cooling rollers is an NIR multimeter head that moves on a traverse over the web and monitors the resin application, cross-linking, moisture and the amount of corundum applied. In the event of deviations from the target specifications, an automatic control or regulation system changes the squeegee/crush rollers, the spreading quantity and/or the temperature control in the dryer.

Example 7

In a coating plant, printed HDF boards (format: 2800× 2070×7 mm) are first coated with a layer of melamine resin. The melamine resin is applied via a roller application unit to the print, which was previously covered with a pre-dried melamine coating of approx. 20 g melamine resin solid/m². The application quantity is approx. 100 g melamine resin liquid/m². The solids content of the resin is approx. 55% by weight and the resin contains the usual auxiliaries (hardener, wetting agent, defoamer, etc.). Approx. 30 g corundum/m² are scattered into the melamine resin with the help of a scattering unit. The corundum has a grain size of F 220 according to the FEPA standard mentioned above. The boards are transported through an NIR dryer and dried by a transport system. Behind the dryer is a first NIR multimeter head mounted on a crosshead that determines the amount of resin applied, the amount of corundum applied and the moisture content of the board. In case of deviation from the target values, the NIR multimeter head, which is connected to the plant control system, adjusts the plant parameters (resin application, spreading quantity and dryer temperature). In further roller application units, approx. 30 g melamine resin liquid/m² (solids content: approx. 55 wt. % with the usual auxiliary materials) is applied twice with subsequent intermediate drying (circulating air or IR drying). Afterwards, approx. 60 g melamine resin liquid/m² (solids content: approx. 55 wt. % with the usual auxiliary materials) is applied in another roller applicator. Afterwards, approx. 20 g glass beads/m² (Potters company, glass bead type 065-90) are scattered on with a scatterer. The resin is dried in an NIR dryer. Afterwards, the application quantity of the resin and the glass beads as well as the moisture and the degree of cross-linking of the resin are checked with another NIR multimeter head. In case of deviations from the target values, an automatic adjustment is made by the system control or regulation, which is connected to the further NIR multimeter head. In a final application unit, approx. 30 g melamine resin liquid/m² (solids content: approx. 55 wt % with the usual auxiliary materials) is applied again. This resin is dried in an IR dryer. Afterwards, the board is pressed with an impregnated backing paper in a short-cycle press.

The invention claimed is:

1. A method for simultaneously determining at least two parameters of at least one paper layer impregnated with at least one resin in an impregnation plant, the method comprising:

impregnating the at least one paper layer with the at least one resin in a production sequence of the impregnation plant;

measuring, recording, and evaluating at least one NIR spectrum of the at least one paper layer impregnated with the at least one resin in a wavelength range between 500 nm and 2500 nm using at least one NIR multimeter measuring head; and simultaneously determining at least two parameters of the at least one paper layer impregnated with the at least one resin based on the at least one NIR spectrum, wherein the at least one NIR multimeter measuring head is connected to a control system for automatically controlling production conditions of the impregnation plant comprising at least one computer-aided evaluation unit and a database for processing and storing NIR data for the measured NIR spectra, and the method further comprises:

in the evaluation unit, simultaneously determining the at least two parameters of the at least one paper layer impregnated with the at least one resin by an automated comparison of the stored NIR data for the measured NIR spectra for the at least one paper layer impregnated with the at least one resin with a calibration model created for the at least two parameters, and storing the at least two parameters of the at least one paper layer impregnated with the at least one resin in the database.

2. The method according to claim 1, wherein the at least two parameters are selected from the group consisting of an amount of the impregnated resin, a degree of curing and a degree of cross-linking of the impregnated resin, a moisture content of the impregnated resin, and, if applicable, an abrasion resistance of the impregnated resin, and an amount of abrasion-resistant particles or further solids scattered onto the impregnated resin.

3. The method according to claim 1, further comprising the following steps:

recording at least one NIR spectrum for each of a plurality of reference samples, each with different values of the at least two parameters, using at least one NIR multimeter measuring head in a wavelength range between 500 nm and 2500 nm;

determining values for the at least two parameters of the plurality of reference samples by non-spectroscopic methods;

assigning the values for the at least two parameters to the corresponding recorded NIR spectrum of each of the plurality of reference samples; and creating a calibration model for a correlation between spectral data each of the NIR spectra and the corresponding assigned values for the at least two parameters using multivariate data analysis.

4. The method according to claim 3, wherein spectral data from the entire recorded spectral range are used to create the calibration model.

5. The method according to claim 3, wherein spectral data from an NIR spectral range of the at least one NIR spectra for each of a plurality of reference samples between 1450 nm and 1550 nm are used for the creation of the calibration model, and spectral data from the at least one NIR spectra for each of a plurality of reference samples are pre-treated by means of suitable mathematical methods and are subsequently fed to the multivariate data analysis.

6. The method according to claim 1, wherein the at least one resin comprises a formaldehyde-containing resin.

7. The method according to claim 1, wherein a solids content of the at least one resin is between 30 and 80 wt.%.

8. The method according to claim 1, wherein the determination of the at least two parameters of the resin is carried out continuously and online.

9. An impregnation plant for carrying out the method according to claim 1, the impregnation plant comprising:
the at least one NIR multimeter head; and
the control system for automatically controlling the production conditions of the impregnation plant.

10. The impregnation plant according to claim 9, wherein the impregnation plant is networked with at least one further production line.

11. The method according to claim 1, wherein the at least two parameters of the at least one paper layer impregnated with the at least one resin are used to control the impregnation plant.

12. The method according to claim 11, wherein the at least two parameters of the at least one paper layer impregnated with the at least one resin are fed to a self-learning, machine learning, AI-based evaluation system for further optimization of the control of the impregnation plant, for prediction of a function of the impregnation plant, for optimization of a start-up process of the impregnation plant, and/or for predictive planning of maintenance work or repairs of the impregnation plant.

13. The method according to claim 1, wherein the wavelength range is between 700 nm and 2000 nm.

14. The method according to claim 1, wherein the wavelength range is between 900 nm and 1700 nm.

15. The method according to claim 1, wherein the wavelength range between 1450 nm and 1550 nm.

16. The method according to claim 1, wherein the at least one NIR measuring head is a NIR multimeter head.

17. The method according to claim 6, wherein the at least one resin comprises a melamine-formaldehyde resin, a urea-formaldehyde resin, or mixture of a melamine-formaldehyde resin and a urea-formaldehyde resin.

18. The method according to claim 7, wherein the solids content of the at least one resin is between 50 and 65 wt. %.

19. The method according to claim 1, wherein the at least one carrier material paper layer is a decorative paper layer or an overlay paper layer.

20. The method according to claim 11, wherein, in the event of a deviation between the at least two parameters for the at least one paper layer impregnated with the at least one resin determined by the evaluation unit from corresponding target values, the control system regulates or anticipates the production sequence of the impregnation plant.

21. The method according to claim 11, wherein, the control system makes an automatic adjustment to the production sequence of the impregnation plant for the at least one paper layer impregnated with the at least one resin when the at least two parameters for the at least one paper layer impregnated with the at least one resin determined by the evaluation unit deviate from corresponding target values.

22. The method according to claim 1, wherein, the NIR measuring head is arranged to irradiate an upper side of the at least one paper layer impregnated with the at least one resin.

23. The method according to claim 12, wherein the impregnation plant is adjusted and optimized by comparing the at least two parameters of the at least one paper layer impregnated with the at least one resin with the already existing data sets of the at least two parameters and evaluating the resulting differences to optimize the start-up process of the impregnation plant.

24. The method according to claim 23, wherein the start-up process of the impregnation plant takes place after one of a repair, regular maintenance, sampling, or the manufacture of a series of small batches of different product types during which the impregnation plant must be stopped.

25. A method for simultaneously determining at least two parameters of at least one paper layer impregnated with at least one resin in an impregnation plant, the method comprising:
impregnating the at least one paper layer with the at least one resin in a production sequence of the impregnation plant;
measuring, recording, and evaluating at least one NIR spectrum of the at least one paper layer impregnated with the at least one resin in a wavelength range between 500 nm and 2500 nm using at least one NIR multimeter measuring head; and
simultaneously determining at least two parameters of the at least one paper layer impregnated with the at least one resin based on the at least one NIR spectrum,
wherein the at least one NIR multimeter measuring head is connected to a control system for automatically controlling production conditions of the impregnation plant comprising at least one computer-aided evaluation unit and a database for processing and storing NIR data for the measured NIR spectra, and the method further comprises:
in the evaluation unit, simultaneously determining the at least two parameters of the at least one paper layer impregnated with the at least one resin by an automated comparison of the stored NIR data for the measured NIR spectra for the at least one paper layer impregnated with the at least one resin with a calibration model created for the at least two parameters, and
storing the at least two parameters of the at least one paper layer impregnated with the at least one resin in the database, and
wherein, the control system makes an automatic adjustment to the production sequence of the impregnation plant for the at least one paper layer impregnated with the at least one resin when the at least two parameters for the at least one paper layer impregnated with the at least one resin determined by the evaluation unit deviate from corresponding target values, and the adjustment comprises the control system automatically adjusting squeegees, squeegee rollers, a spreading quantity of the resin, and/or a temperature control of a dryer in the impregnation plant.

* * * * *

UNITED STATES PATENT AND TRADEMARK OFFICE
CERTIFICATE OF CORRECTION

PATENT NO. : 12,487,174 B2  
APPLICATION NO. : 17/914554  
DATED : December 2, 2025  
INVENTOR(S) : Norbert Kalwa Page 1 of 1

It is certified that error appears in the above-identified patent and that said Letters Patent is hereby corrected as shown below:

In the Claims

Column 23, Line 38, Claim 19, delete "one carrier material" and insert -- one --

Signed and Sealed this  
Third Day of February, 2026

John A. Squires  
*Director of the United States Patent and Trademark Office*